(12) United States Patent
Oh

(10) Patent No.: US 9,874,442 B2
(45) Date of Patent: Jan. 23, 2018

(54) DEVICE FOR MEASURING INCLINATION OF GREEN IN GOLF COURSE

(71) Applicant: Jin Woo Oh, Incheon (KR)

(72) Inventor: Jin Woo Oh, Incheon (KR)

( * ) Notice: Subject to any disclaimer, the term of this patent is extended or adjusted under 35 U.S.C. 154(b) by 224 days.

(21) Appl. No.: 14/896,543

(22) PCT Filed: Mar. 27, 2014

(86) PCT No.: PCT/KR2014/002590
§ 371 (c)(1),
(2) Date: Dec. 7, 2015

(87) PCT Pub. No.: WO2014/196731
PCT Pub. Date: Dec. 11, 2014

(65) Prior Publication Data
US 2016/0131478 A1 May 12, 2016

(30) Foreign Application Priority Data
Jun. 5, 2013 (KR) .......................... 10-2013-0064467

(51) Int. Cl.
*G01C 9/12* (2006.01)
*A63B 69/36* (2006.01)
(Continued)

(52) U.S. Cl.
CPC ................ *G01C 9/12* (2013.01); *A63B 57/00* (2013.01); *A63B 69/3676* (2013.01);
(Continued)

(58) Field of Classification Search
CPC ... G01C 9/12; G01C 9/06; G01C 9/16; G01C 9/10; G01C 15/105; G01C 2009/064;
(Continued)

(56) References Cited

U.S. PATENT DOCUMENTS

| 4,118,707 A | * | 10/1978 | Yoshida | H01Q 1/18 33/321 |
| 4,606,133 A | * | 8/1986 | Mills | G01C 9/06 33/346 |
| 4,680,867 A | * | 7/1987 | Hufman | G01C 9/12 33/391 |
| 4,747,217 A | * | 5/1988 | Austin | G01C 9/12 33/391 |
| 4,995,169 A | * | 2/1991 | Lunden | G01B 11/26 250/237 G |

(Continued)

FOREIGN PATENT DOCUMENTS

KR 2019990037136 10/1999
KR 1020110014497 2/2011

*Primary Examiner* — Yaritza Guadalupe-McCall
(74) *Attorney, Agent, or Firm* — IPLA P.A.; James E. Bame

(57) ABSTRACT

A device for measuring an inclination of a green in a golf course. The device includes: a rotation member (200) having a weight member (210) provided eccentrically relative to a central axis of the rotation member such that the rotation member (200) freely rotates around a rotation shaft (220), the rotation member (200) having horizontal and vertical measurement lines; a first casing (110) having an accommodation space (112); and a second casing (120) fitted over the first casing (110), the second casing (120) having first rotation graduations, a horizontal judge line (h) and a vertical judge line (v), wherein the rotation member (200) comes into close contact with both the first casing (110) and the second casing (120), and then is stopped by a pressure generated between the first and second casings or by simultaneously pressing both a flange (224) of the rotation shaft and the first casing (110).

13 Claims, 7 Drawing Sheets

(51) Int. Cl.
*A63B 71/06* (2006.01)
*A63B 57/00* (2015.01)
*G02B 25/00* (2006.01)
*A63B 102/32* (2015.01)

(52) U.S. Cl.
CPC ............ *A63B 71/06* (2013.01); *G02B 25/002* (2013.01); *A63B 2102/32* (2015.10); *A63B 2209/08* (2013.01); *A63B 2210/50* (2013.01); *A63B 2210/58* (2013.01)

(58) Field of Classification Search
CPC .... G01C 9/14; G01C 15/10; G01C 2009/107; G01C 9/20
USPC .......................................................... 33/391
See application file for complete search history.

(56) References Cited

U.S. PATENT DOCUMENTS

| | | | |
|---|---|---|---|
| 5,448,835 A * | 9/1995 | Lewis ..................... | G01C 17/26 33/355 R |
| 6,073,356 A * | 6/2000 | Li ............................ | G01C 9/12 33/373 |
| 7,089,674 B1 * | 8/2006 | Hendon ................. | G01C 9/005 33/328 |
| 2015/0377620 A1 * | 12/2015 | Heerschap ............. | G01C 17/16 33/301 |
| 2016/0131478 A1 * | 5/2016 | Oh ..................... | A63B 69/3676 33/391 |

\* cited by examiner

DEVICE FOR MEASURING INCLINATION OF GREEN IN GOLF COURSE

BACKGROUND

The present invention generally relates to a device for measuring an inclination and a height around a hole cup, and for measuring a height of a green in a golf course, wherein a right and left inclination of a hole cup placed in an inclined green is determined by measuring an angle relative to a horizontal line using a major axis of the hole cup and gravity, determining a height between a golf ball and a hole cup by measuring an angle relative to a horizontal line between the golf ball and the hole cup in a green, and determining a height of a green by using a horizontal distance with a yard marker and an elevation angle at a location on the green. More particularly, the present invention relates to a device for measuring an inclination of a green in a golf course, the device being capable of simply measuring an inclination angle that is required to measure putting inclination and a distance according thereto.

Generally, in golf, in order to sink a golf ball in a hole in a green, there is need to putt the ball, whereby a golfer has to take into consideration a distance between a location where a golf ball is located and a hole cup, a right and left inclination around the hole cup, and a height (ascent/descent) between the golf ball and the hole cup. In other words, when putting in golf, a right and left inclination around the hole cup, and a height between the golf ball and the hole cup are crucial factors in deciding a direction and distance of putting. Thus, sinking the ball is dependent upon an accurate determination and a stroke. In addition, when taking an approach shot that sends the ball nearer the hole cup, there is need to change golf clubs, taking into consideration a distance between a location of a golf ball and the green, the height of a green, etc.

Generally, in order to verify requirements that are mentioned above, a direction and a distance of stroke, selection of a club, or an adjustment of a swing direction is made with eye measurement or by guesswork. However, in this case, many trials and errors are caused by eye measurement, which is a barrier to improving golf skill. To solve this problem, a digitized device has been developed. However, the device is problematic in that a price thereof is high, the device is inaccurate, etc. Thus, the device is not commonly used. To solve this problem, Korean Utility Model Registration No. 443304 discloses a device, wherein a pendulum is used in order to roughly measure an inclination of a green.

However, the device according to Korean Utility Model Registration No. 443304 provides only approximate inclination information and does not provide accurate inclination angle relative to a ground surface of a green located within an inclination angle to be judged. Therefore, accuracy is not provided in judgment of a direction and a distance for putting. Further, a height between a location of a golf ball on a fairway and a hole cup in a green is not provided, either. To solve this problem, Korean Patent Application No. 10-2010-136993, which is filed by an applicant of the present invention, discloses a device for measuring an inclination angle and a height of a green in a golf course. The device includes: a casing, wherein an angle relative to a reference line is presented on a front surface thereof so as to measure an inclination angle of a green; an inclination angle measurement part presenting an angle between a direction of the reference line and a direction of gravity, wherein the inclination angle measurement part presents a horizontal reference line and a vertical reference line on the front surface of the casing; an inclination angle display part presenting a rotation angle of a needle relative to the horizontal and the vertical reference line; and a needle capable of rotating relative to the inclination angle display part by using gravity.

As shown in FIG. 2 of Korean Patent Application No. 10-2010-136993, there is provided a gripping part in order to measure an inclination angle after the needle indicates a certain angle. The gripping part includes: a pair of gripping supports to temporarily maintain a measured angle of a vertical needle member for a predetermined time when an angle of a green is measured, wherein a pair of the gripping supports are configured to have a rounded circumference corresponding to a display of an azimuth of a horizontal graduation display part; and a gripping groove capable of being gripped by partially exposing an end of the vertical needle member that is placed between a pair of the gripping supports and an outer circumference. However, in this case, the device is problematic in that foreign substances or rainwater flow into the gripping groove, making the needle member improperly function because of a failure to rotate. Further, the device is problematic in that the needle is deformed by gripping the needle member, and at the same time it is inconvenient to grip the pointed needle. Therefore, the development of a device for measuring an inclination of a green in a golf course is required in order to solve these problems.

SUMMARY OF THE INVENTION

Accordingly, the present invention has been made keeping in mind the above problems occurring in the related art, and the present invention is intended to propose a device for measuring an inclination of a green in a golf course so that a right and left inclination around a hole cup and a height between a golf ball and a hole cup can be measured by accurately determining an inclination angle around the hole cup through a simple structure capable of easily preventing a needle member from shaking by using gravity. The present invention is also intended to propose a device for measuring an inclination of a green in a golf course, the device being capable of accurately measuring an inclination angle of a green, etc. by preventing foreign substances from naturally flowing via gravity in a rotation shaft of the needle member.

Further, the present invention is intended to propose a compact device for measuring an inclination of a green in a golf course so that an inclination angle between an extension line of a green or a golf flag, and an actual horizontal line can be simply measured regardless of a distance between a hole cup and a golf ball.

In order to achieve the above object, according to one aspect of the present invention, there is provided a device for measuring an inclination of a green in a golf course including: a rotation member 200 having a weight member 210 provided eccentrically relative to a central axis of the rotation member such that the rotation member 200 freely rotates around a rotation shaft 220, the rotation member 200 having a horizontal measurement line HL and a vertical measurement line VL marked thereon; a first casing 110 having an accommodation space 112 for allowing a free rotation of the rotation member 200 on the rotation shaft 220; and a second casing 120 fitted over an outer circumference of the first casing 110 having the accommodation space 112, the second casing 120 having first rotation graduations marked along a circumference thereof, and a horizontal judge line h and a vertical judge line v marked thereon, wherein the rotation member 200 comes into close contact with both the first casing 110 and the second casing 120, and then is stopped by a pressure generated between the first casing 110 and the second casing 120.

According to the present invention having the above-described characteristics, it is possible to prevent a defect caused by foreign substances and to provide the device with no opening part to support a needle, whereby simple measurement of an inclination angle of a green, etc. is possible by stopping a rotation member without specifying a location where a second casing or a rotation shaft is pressurized against a first casing.

BRIEF DESCRIPTION OF DRAWINGS

FIG. 4b is an exploded sectional view showing a state where the extension member is unfolded of FIG. 4a.

DETAILED DESCRIPTION OF THE INVENTION

Figure 1:
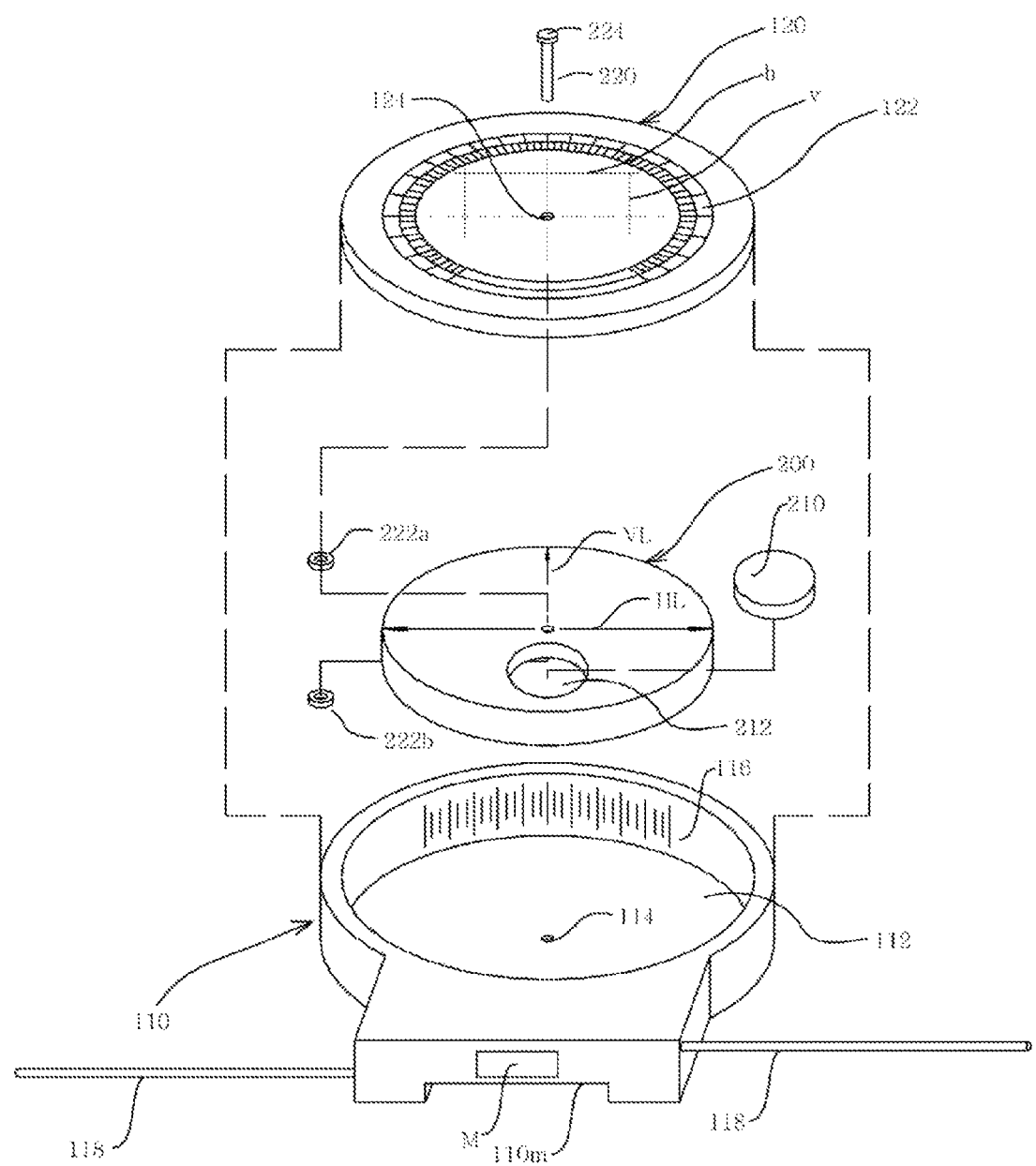
FIG. 1 is an exploded sectional view showing a device for measuring an inclination of a green in a golf course according to one embodiment of the present invention.

According to the present invention, there is provided a device for measuring an inclination of a green in a golf course, including: a rotation member 200 having a weight member 210 provided eccentrically relative to a central axis of the rotation member such that the rotation member 200 freely rotates around a rotation shaft 220, the rotation member 200 having a horizontal measurement line HL and a vertical measurement line VL marked thereon; a first casing 110 having an accommodation space 112 for allowing a free rotation of the rotation member 200 on the rotation shaft 220; and a second casing 120 fitted over an outer circumference of the first casing 110 having the accommodation space 112, the second casing 120 having first rotation graduations marked along a circumference thereof, and a horizontal judge line h and a vertical judge line v marked thereon, wherein the rotation member 200 comes into close contact with both the first casing 110 and the second casing 120, and then is stopped by a pressure generated between the first casing 110 and the second casing 120 or by simultaneously pressing both a flange 224 of the rotation shaft and the first casing 110.

Reference will now be made in greater detail to a device for measuring an inclination of a green in a golf course according to an exemplary embodiment of the present invention with reference to the accompanying drawings.

Figure 2:
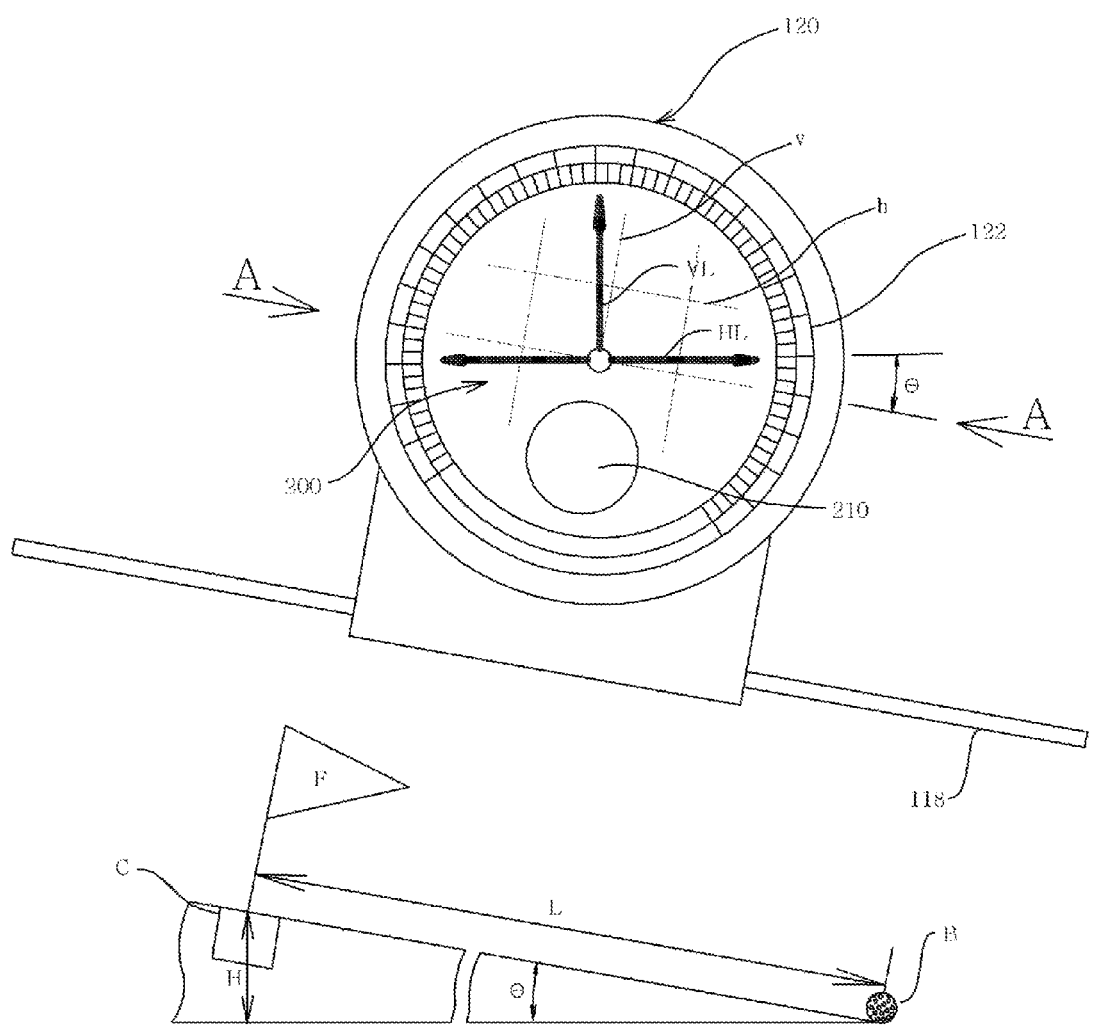
FIG. 2 is a schematic view showing a state of an operation of the device to determine an inclination of a green, etc. or a height of a green according to the one embodiment of the present invention.

FIG. 1 is an exploded perspective view of a device for measuring an inclination of a green in a golf course according to one embodiment of the present invention. FIG. 2 is a schematic view illustrating a state of determining an inclination of a green or a height of the green, etc. by using the device according to the one embodiment of the present invention.

Figure 3A:
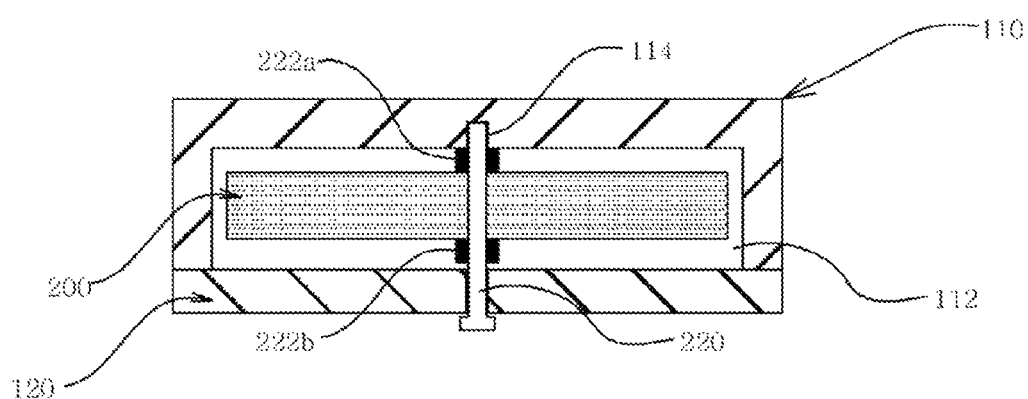
FIG. 3a is a schematic sectional view taken along line A-A showing a process of the device before a rotation member is stopped according to the one embodiment of the present invention.
Figure 3B:
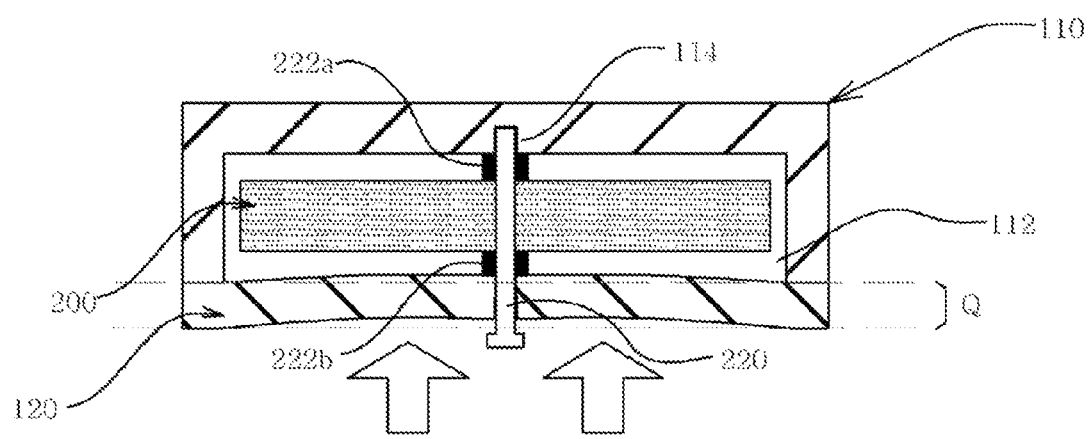
FIG. 3b is a schematic sectional view taken along line A-A showing a process of the device after the rotation member is stopped according to the one embodiment of the present invention.

FIGS. 3a and 3b are schematic sectional views taken along line A-A of FIG. 2 illustrating a process of stopping a rotation member of the device according to the one embodiment of the present invention.

As shown in FIGS. 1 to 3b, the device for measuring an inclination of a green in a golf course, according to the one embodiment of the present invention, includes: a rotation member 200 having a weight member 210 provided eccentrically relative to a central axis of the rotation member such that the rotation member 200 freely rotates around a rotation shaft 220, the rotation member 200 having a horizontal measurement line HL and a vertical measurement line VL marked thereon; a first casing 110 having an accommodation space 112 for allowing a free rotation of the rotation member 200 on the rotation shaft 220; and a second casing 120 fitted over an outer circumference of the first casing 110 having the accommodation space 112, the second casing 120 having first rotation graduations marked along a circumference thereof, and a horizontal judge line h and a vertical judge line v marked thereon, wherein the free rotation of the rotation member 200 is stopped by a pressure generated between the first casing 110 and the second casing 120 or by a pressure generated between the first casing 110 and the rotation shaft 220.

Here, the rotation member 200 may be in a shape of a disc. The rotation member 200 is provided with an accommodation groove 212 so as to accommodate the weight member 210 eccentrically relative to an extension of the vertical measurement line VL that passes through the central axis of the rotation member 200. The rotation shaft 220 penetrates the central axis of the rotation member 200. Thus, the rotation member 200 freely rotates relative to the first casing 110 and the second casing 120. In addition, the rotation member 200 is marked with the horizontal measurement line HL and the vertical measurement line VL based on the central axis thereof.

Meanwhile, the rotation member 200 is provided with spacers 222a and 222b on a front surface and a rear surface thereof respectively, wherein the spacers 222a and 222b are configured such that centers thereof are the rotation shaft 220 by being fitted over the rotation shaft 220 at locations between the first casing 110 and the second casing 120. Here, a size of the spacers 222a and 222b may be much smaller than that of the rotation member 200. In addition, the spacers 222a and 222b may be in a shape of a ball made of light materials or may be a bearing.

The rotation shaft 220 may be penetrated with a gap or may be fitted relative to the central axis of the rotation member 200. Meanwhile, a first end of the rotation shaft 220 may be provided with a flange 224, the flange 224 protruding through a rotation hole 124 of the second casing 120.

When the rotation member 200 freely rotates around the rotation shaft 220, the horizontal measurement line HL and the vertical measurement line VL of the rotation member 200 indicate an actual horizontal line and an actual vertical line by the weight member 210.

The first casing 110 has the accommodation space 112 for allowing a free rotation of the rotation member 200 on the rotation shaft 220. A center of the accommodation space 112 is provided with a rotation groove 114, the rotation groove 114 allowing the rotation member 200 to freely rotate by seating a second end of the rotation shaft 220 therein.

Meanwhile, second rotation graduations 116 are provided on an inner circumferential surface of the first casing 110 having the accommodation space 112, the second rotation graduations 116 presenting an angle that the vertical measurement line VL of the rotation member 200 indicates. Here, the circumference of the first casing 110 may be made of transparent materials.

Further, an extension member 118 is a pair of arms and is provided on a bottom surface of the first casing 110, wherein the extension member 118 extends in opposite directions and is received in a sliding channel. In particular, when an inclination angle at a long distance or a height based thereon is measured, the extension member 118 is used to expand a limited view by sliding the extension member 118 of the first casing 110 in opposite directions. For instance, when a line of the extension member 118 is matched with a slope line between a hole cup (or a hole flag) and a golf ball, it is easy to measure a displacement angle (an inclination angle and a rotation angle) of the first rotation graduations 122 on the second casing 120 relative to the horizontal measurement line HL or the vertical measurement line VL of the rotation member 200.

As described hereinbefore, the extension member 118 is configured to slide in opposite directions relative to the first casing 110. However, the extension member 118 may have a different configuration to provide an extension line for a function described above. For instance, the extension member 118 may be configured to be connected to the first casing 110 by a foldable arm so that the extension member 118 can provide an extension line when the extension member 118 is unfolded.

Figure 4A:
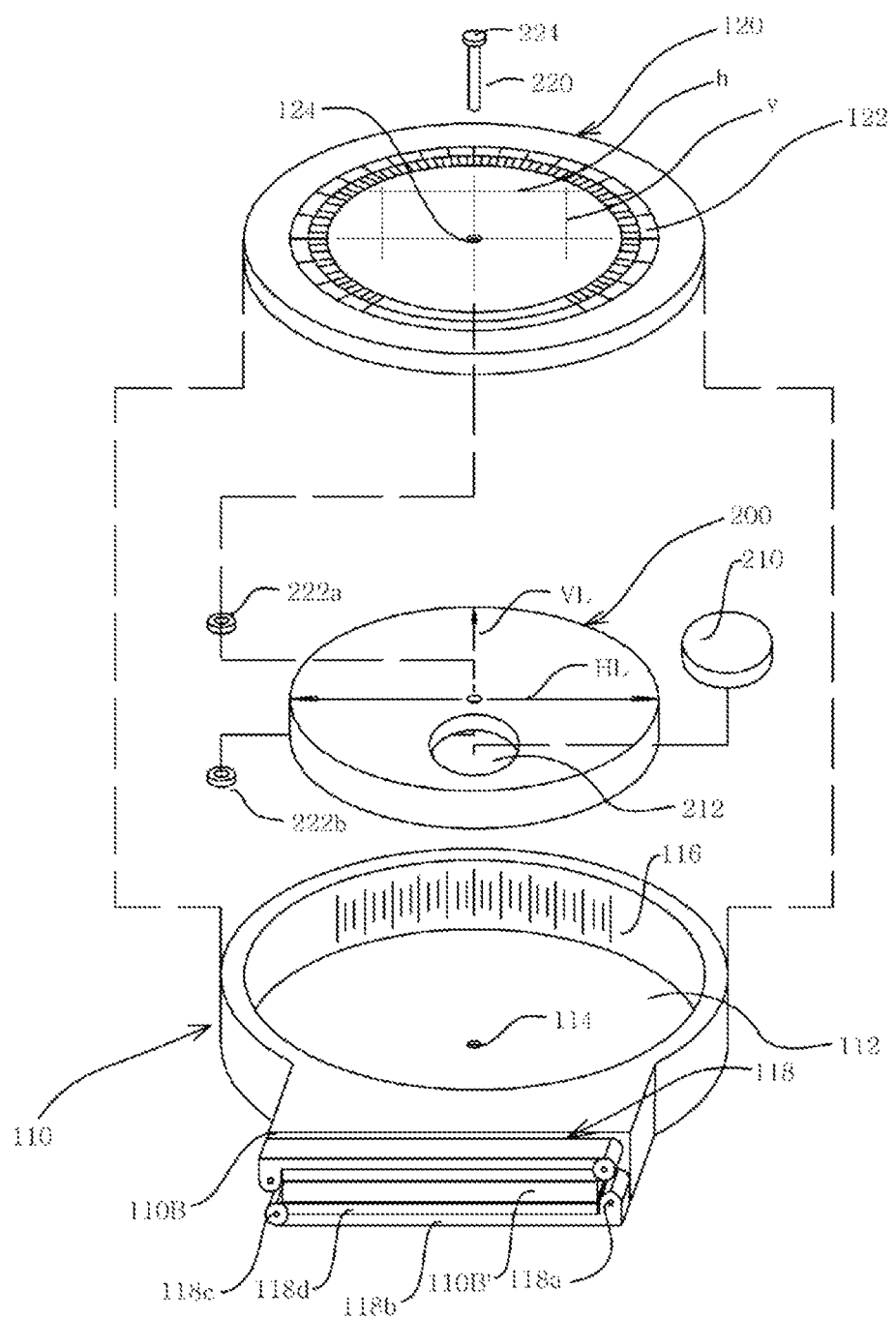
FIG. 4a is an exploded sectional view of the device showing a state where an extension member is folded according to the one embodiment of the present invention.
Figure 4B:
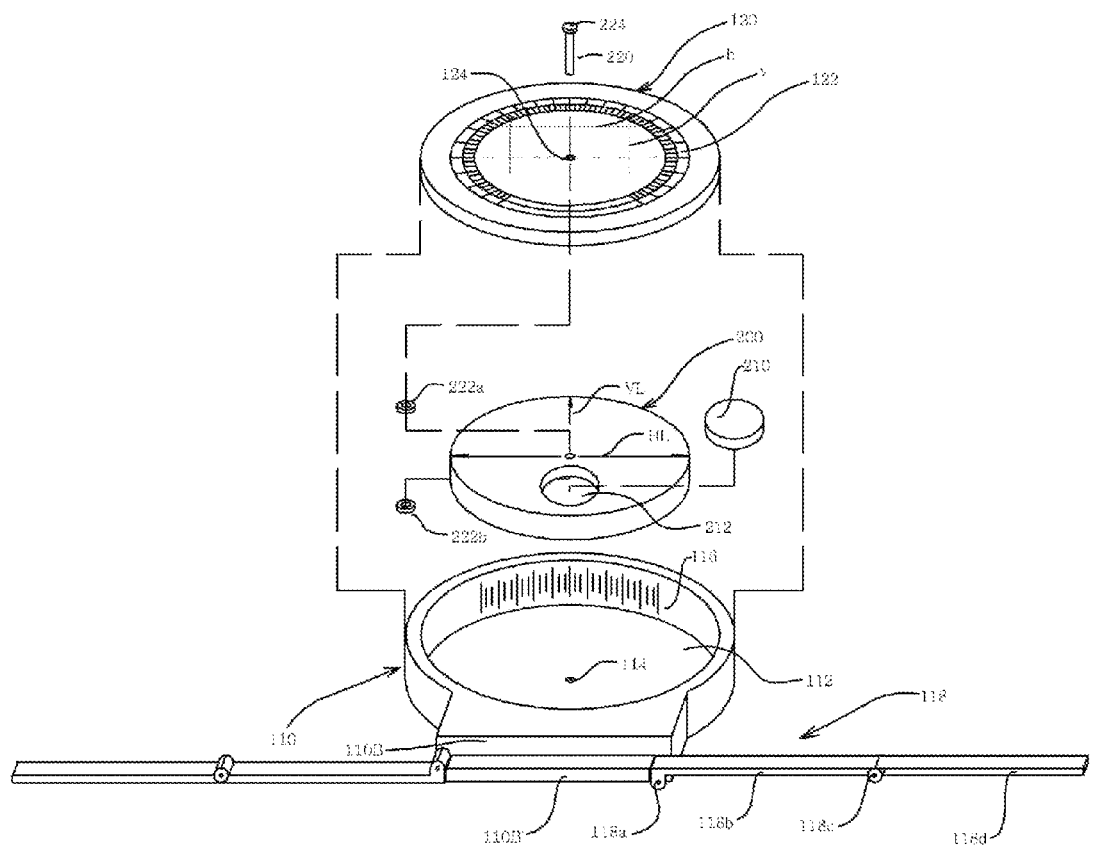

For example, as shown in FIGS. 4a and 4b, the device for measuring an inclination of a green in a golf course according the one embodiment of the present invention, the device may be configured such that the extension member 118 is a pair of arms including a first arm 118b and a second arm 118d. The first arm 118b may be configured such that a first end thereof is hingedly connected to a hinge shaft 118a, the hinge shaft 118a coupled to a bottom surface 110B of the first casing 110. The second arm 118d may be configured to be hingedly connected to a second end of the first arm 118b by means of a hinge shaft 118c. Here, the respective extension members 118 may be coupled to and unfolded at opposite ends of a protrusion 110B' that protrudes in a longitudinal direction of the bottom surface 110B of the first casing 110. In addition, the extension member 118 may be marked with a judge line along a longitudinal direction thereof.

Meanwhile, a rear surface of the first casing 110 is provided with an attachment groove 110m to attach a ball marker (not shown) by means of a magnetic force of an embedded magnet (not shown). Here, the attachment groove 110m may be open in an end thereof, which may allow the ball marker attached on the rear surface of the first casing 110 to slide out and to be withdrawn with ease.

The second casing 120 is fitted over the outer circumference of the first casing 110 having the accommodation space 112 so that the rotation member 200 can freely rotate in the accommodation space 112 of the first casing 110. The first rotation graduations 122 presenting a rotation angle are marked along a circumference of the second casing 120 at regular intervals. The second casing 120 is provide with a rotation hole 124 for allowing a first end of the rotation shaft 220 to be seated or to be penetrated through. Here, any end of the rotation shaft 220 may be provided with a flange 224 that protrudes outside of the rotation hole 124.

Meanwhile, a horizontal judge line h and a vertical judge line v are marked on the second casing 120 based on the rotation hole 124. The horizontal line h of the second casing 120 is provided to match a slope line between a hole cup and a golf ball around the hole cup or to match a line relative to a major axis of the hole cup or to match a slope line between a hole cup (or a hole cup flag) and a golf ball therewith.

The second casing 120 may be made of a transparent synthetic resin material that can be elastically restored.

Hereinafter, a description will be made on an operation of the device for measuring an inclination of a green in a golf course according to the one embodiment of the present invention. For example, as shown in FIGS. 2 to 3b, when a user wants to know a height H between a flag F of a hole cup C and a golf ball B is determined, the user must firstly match an extension line between the flag F of the hole cup C and the ball B with the horizontal judge line h or with a line of the extension member 118 that is extended by sliding or folding.

Here, the rotation member 200 rotates relative to the first casing 110 and the second casing 120 by the weight member 210. Thus, the horizontal measurement line HL or the vertical measurement line VL of the rotation member 200 indicates an inclination angle θ relative to the first rotation graduations 122 of the second casing 120. In this state, the user pressurizes the first casing 110 against the second casing 120. The second casing 120 is pressed toward the first casing 110 by a press. Accordingly, the first casing 110 and the second casing 120 come into close contact with each other through the medium of the spacers 222a and 222b, and then the rotation member 200 is stopped. In a state where the rotation member 200 is stopped, the user can check the inclination angle θ that the horizontal measurement line HL or the vertical measurement line VL of the rotation member 200 indicates, at close range.

A height H=L (L>>H) between a golf ball and a hole cup (or a hole cup flag) relative to a distance L between the hole cup and the golf ball can be determined by the identified inclination angle θ or a yard marker of a fairway.

Similarly, a height (ascent/descent) between the ball and the hole cup in a green can be measured in a same manner. However, the distance L between the hole cup and the golf ball can be measured by a user's stride, meaning the number of steps. To measure an inclination angle θ between the golf ball and the hole cup, the user matches the extension line between hole cup C and the golf ball B with the horizontal judge line h of the second casing 120. After matching the line, as mentioned above, the user stops the rotation member 200 by a pressure generated from the first casing 110 and the second casing 120. In a state where the rotation member 200 is stopped, the user can check the inclination angle θ indicated by the horizontal measurement line HL or the vertical measurement line VL of the rotation member 200 at close range, and the height H=L (L>>H) between the ball and the hole cup can be determined by checking the inclination angle θ.

Meanwhile, when the user wants to know a right and left inclination around the hole cup, firstly, the user must match a major axis of the hole cup with the horizontal judge line h of the second casing 120 at a predetermined distance from the hole cup. After that, as described above, the user stops the rotation member 200 by a pressure generated from the first casing 110 and the second casing 120. In a state where the rotation member 200 is stopped, the user checks the inclination angle θ indicated by the horizontal measurement line HL or the vertical measurement line VL at close range. Thereby, the right and left inclination around the hole cup, and the inclination degree can be determined, which may help in effectively putting.

Meanwhile, to compensate for hand shaking in measuring an inclination around a hole cup at a short distance, a vertical bottom surface of the first casing 110 may have a magnet M therein. It is more accurate to measure the inclination or the inclination angle around the hole cup in a state where the magnet M provided in the bottom surface of the first casing 110 is temporarily mounted to an end of a putter.

The device according to the one embodiment of the present invention may be configured such that the second casing 120 is made of a synthetic resin material that can be elastically restored. Thus, when the second casing 120 is pressurized against the first casing 110, the rotation member 200 comes in to close contact with both the first casing 110 and the second casing 120 through a medium of spacers 222a and 222b by a pressure, and then the rotation member 200 is stopped. Therefore, it may help to simply measure a rotation angle, and at the same time help to prevent a foreign substance outside from flowing into the device.

Figure 5A:
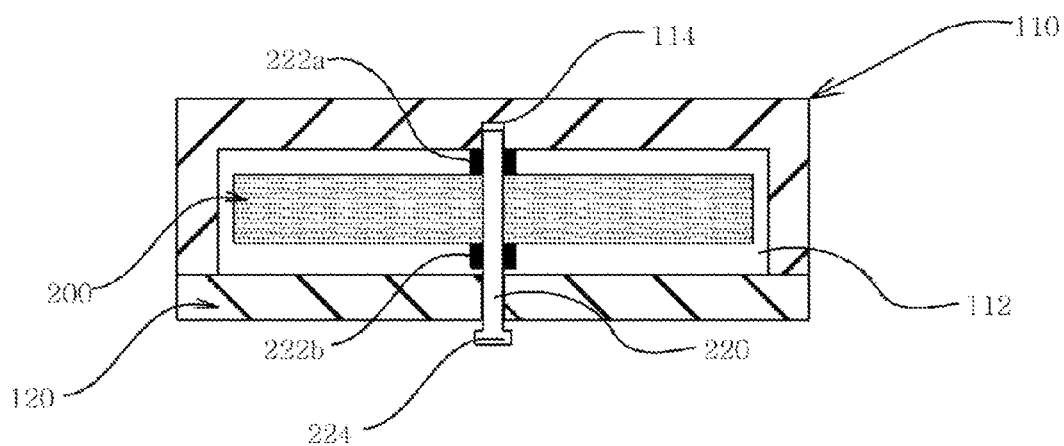
FIG. 5a is a schematic sectional view taken along line A-A showing a process of the device before the rotation member is stopped according to another embodiment of the present invention.
Figure 5B:
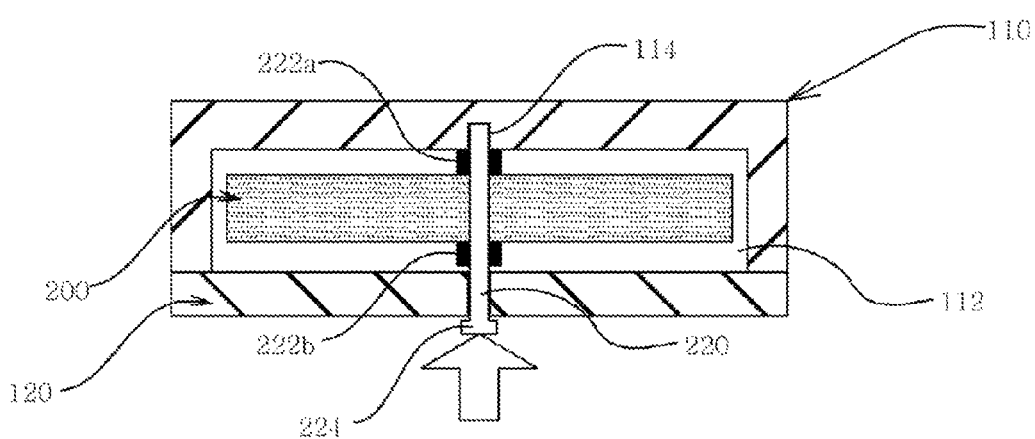
FIG. 5b is a schematic sectional view taken along line A-A showing a process of the device after the rotation member is stopped according to another embodiment of the present invention.

FIGS. 5a and 5b are schematic sectional views taken along line A-A of FIG. 2 illustrating a process of stopping a rotation member of the device according to another embodiment of the present invention. In the device according to the another embodiment, the same reference numerals will be used throughout the drawings and the description to refer to the same or like parts as the embodiment mentioned above, and an explanation thereof will be skipped.

The device, according to the another embodiment of the present invention, is configured such that a first end of the rotation shaft 220 is provided with a flange 224 that protrudes through a rotation hole 124 of the second casing 120, wherein the rotation shaft 220 is fixedly mounted to the rotation member 200.

As mentioned above, when a right and left inclination around a hole cup, a height according to an inclination between a hole cup and a golf ball on a green, or a height according to an inclination between a hole cup and a golf ball outside of a green is measured, the rotation member 200 may be stopped by pressurizing the flange 224 protruding out of the rotation hole 124 of the second casing 120, against the first casing 110.

Meanwhile, according to still another embodiment of the present invention, when an inclination of a green in a golf course is measured at a long distance, the extension member may be received by rotating toward a main body of a casing. When necessary, the extension member may rotate in an opposite direction, and slide out for use.

Figure 6A:
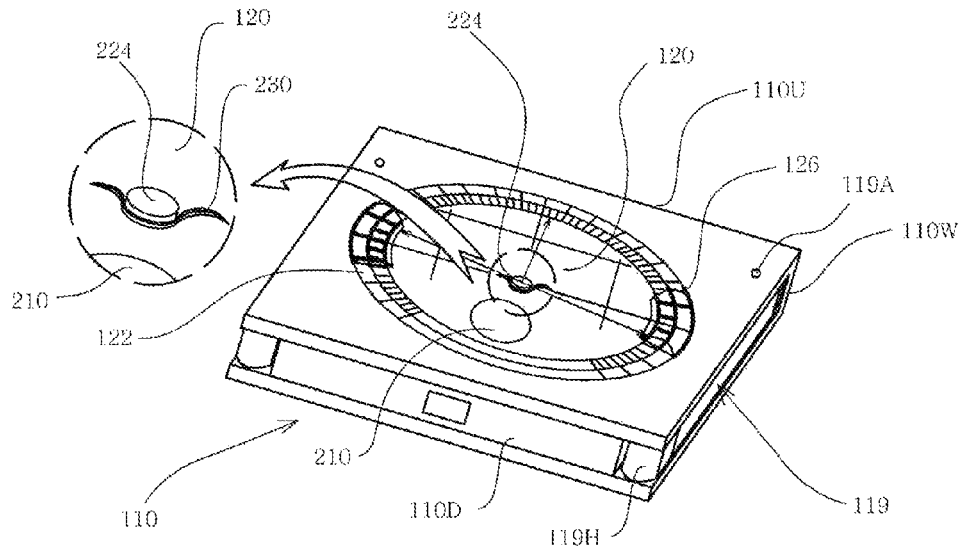
FIG. 6a is a perspective view of the device according to still another embodiment of the present invention.
Figure 6B:
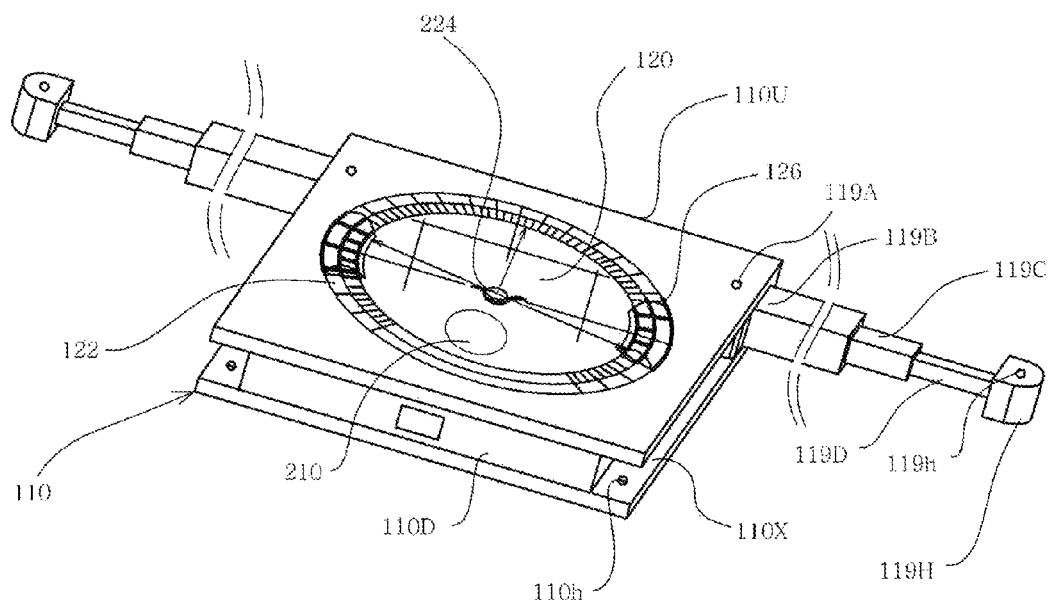
FIG. 6b is an exploded sectional view showing a state of the device where the extension member is unfolded according to the still another embodiment of the present invention.

FIG. 6a is a perspective view of the device according to the still another embodiment of the present invention. FIG. 6b is a perspective view illustrating an unfolded state of the extension member of the device according to the still another embodiment of the present invention. In the device according to the still another embodiment, the same reference numerals will be used throughout the drawings and the description to refer to the same or like parts as the one embodiment and the another embodiment, and an explanation thereof will be skipped. Hereinbelow, a difference therebetween will be described.

As shown in FIGS. 6a and 6b, according to the still another embodiment of the present invention, unlike the one embodiment, the device is configured such that the second rotation graduations are not marked, both the front and the rear surface of the first casing 110 are rectangular, wherein opposite sides of the first casing 110 are provided with the accommodation grooves 110X respectively. The accommodation grooves are provided with hinge holes to hingedly connect the extension member 119 to the hinge shaft 119A. The accommodation groove 110X of the first casing 110 placed the bottom surface 110D of the first casing 110 is open in a first side, wherein a seating groove 110h is provided therein in order to prevent the extension member 119 from deviating out of the accommodation groove 110X when the extension member 119 is received in the accommodation groove 110X of the first casing 110. Meanwhile, a second side of the accommodation groove 110X formed on an upper side 110U of the first casing 110 is provided with a locking protrusion 110W for allowing the extension member 119 to be unfolded parallel to the upper side 110 U of the first casing 110 when the extension member 119 rotates relative to the hinge shaft 119A and is unfolded.

The extension member 119 includes: a rotation block provided on a first end of the extension member 119 such that the rotation block rotates about a hinge shaft 119A in each of the accommodation grooves 110X of the first casing 110, a rotation arm 119B having a sliding channel therein and provided on a second end of the extension member 119, a first sliding arm 119C having a first sliding channel therein and sliding to the sliding channel of the rotation arm 119B so as to be capable of being extended and shortened, and a second sliding arm 119D sliding to the first sliding channel of the first sliding arm 119C so as to be capable of being extended and shortened.

A first end of the second sliding arm 119D may be provided with a seating member 119H having a seating protrusion 119h so as to prevent the extension member 119 from deviating out of the accommodation groove 110X by being seated therein when the extension member 119 is received in the accommodation groove 110X.

Meanwhile, the device according to the still another embodiment may further include a magnifying glass 126 that makes the first rotation graduations 122 look bigger. The magnifying glass 126 may be made of a synthetic material and may be integrally formed with the second casing 120.

Meanwhile, the device according to the still another embodiment may further includes a protection guard 230 provided on the second casing 120 at a location around the flange 224 placed on the rotation shaft 220 so that the rotation shaft 220 can be protected when the second casing 120 is pressed to stop the rotation member 200.

The protection guard 230 may be made of a synthetic material, and may be integrally formed with the second casing 120.

According to the still another embodiment of the present invention, the device is capable of simply measuring an inclination at a long distance by a rotation and slide of the extension member 119 from the first casing 110, thereby the size of the device may be compact.

According to the still another embodiment of the present invention, it is possible to make the device compact, and to easily measure an inclination at a long distance due to a rotation and a slide of the extension member 119 from the first casing 110.

According to the present invention, it is possible to simply measure an inclination angle of a green by stopping the rotation member without specifying a location where the second casing or the rotation shaft is pressurized against the first casing.

The invention claimed is:

1. A device for measuring an inclination of a green in a golf course, the device comprising:
   a rotation member (200) including a weight member (210) provided eccentrically relative to a central axis of the rotation member such that the rotation member (200) freely rotates around a rotation shaft (220), the rotation member (200) having a horizontal measurement line (HL) and a vertical measurement line (VL) marked thereon;
   a first casing (110) having an accommodation space (112) for allowing a free rotation of the rotation member (200) on the rotation shaft (220); and
   a second casing (120) fitted over an outer circumference of the first casing (110) having the accommodation space (112), the second casing (120) having first rotation graduations marked along a circumference thereof, and a horizontal judge line (h) and a vertical judge line (v) marked thereon, wherein
   the rotation member (200) comes into close contact with both the first casing (110) and the second casing (120), and then is stopped by a pressure generated between the first casing (110) and the second casing (120).

2. The device of claim 1, wherein the second casing (120) is elastically deformed relative to the first casing (110) by a pressure force, and thereby the rotation member (200) comes into close contact with both the first casing (110) and the second casing (120), and then is stopped by the pressure generated between the first casing (110) and the second casing (120).

3. The device of claim 1, wherein a first end of the rotation shaft (220) is provided with a flange (224), the flange protruding through a rotation hole (124), and the rotation shaft (220) is fixedly mounted to the rotation member (200), wherein when the flange (224) is pressurized against the first casing (110), the rotation member (200) comes into close contact with the first casing (110) and then is stopped.

4. The device of claim 1, wherein the rotation member (200) is in a shape of a disc, and is marked with the horizontal measurement line (HL) and the vertical measurement line (VL) based on the central axis of the rotation member.

5. The device of claim 4, wherein the rotation member (200) is provided with spacers (222a and 222b) respectively on a front surface and a rear surface thereof, wherein the spacers (222a and 222b) are configured such that centers thereof are the rotation shaft (220) by being fitted over the rotation shaft (220) at locations between the first casing (110) and the second casing (120).

6. The device of claim 4, further comprising: second rotation graduations (116) provided on an upper part of an inner circumferential surface of the first casing (110) having the accommodation space (112), the second rotation graduations presenting an angle that the vertical measurement line (VL) of the rotation member (200) indicates.

7. The device of claim 4, further comprising: an extension member (118) provided on a vertical bottom surface of the first casing (110), the extension member (118) extending in opposite directions parallel to the horizontal measurement line (HL).

8. The device of claim 7, wherein the extension member (118) is configured to be received in a sliding channel (not shown) provided on the vertical bottom surface of the first casing (110) and to be capable of sliding from the sliding channel, or is configured to be connected to the first casing (110) by a foldable arm (not shown) and to be capable of being unfolded.

9. The device of claim 8, wherein the extension member (118) is a pair of arms comprising a first arm (118b) and a second arm (118d), wherein the first arm (118b) is configured such that a first end thereof is hingedly connected to a hinge shaft (118a), the hinge shaft (118a) coupled to a bottom surface (110B) of the first casing (110), and the second arm (118d) configured to be hingedly connected to a second end of the first arm (118b) by means of a hinge shaft (118c).

10. The device of claim 9, wherein the respective extension members (118) are coupled to and unfolded at opposite ends of a protrusion (110B') protruding in a longitudinal direction of the bottom surface (110B) of the first casing (110).

11. The device of claim 4, wherein opposite sides of the first casing (110) are provided with respective accommodation grooves (110X), and the extension member (119) includes: a rotation block provided on a first end of the extension member (119) such that the rotation block rotates about a hinge shaft (119A) in each of the accommodation grooves (110X) of the first casing (110), a rotation arm (119B) having a sliding channel therein and provided on a second end of the extension member (119), and sliding arms (119C and 119D) sliding in the sliding channel of the rotation arm (119B) so as to be capable of being extended and shortened.

12. The device of claim 11, wherein the sliding arms (119C and 119D) include a first sliding arm (119C) provided with a first sliding channel therein, and a second sliding arm (119D) that slides to the sliding channel of the first sliding arm (119C), wherein a first end of the second sliding arm (119D) is provided with a seating member (119H) having a seating protrusion (119h) so that the extension member (119) is prevented from deviating out of the accommodation groove (110X) when the extension member (119) is received in the accommodation groove (110X) of the first casing (110).

13. The device of claim 4, further comprising:
   a magnifying glass (126) that makes the first rotation graduations (122) look bigger; and
   a protection guard (230) provided on the second casing (120) at a location around the rotation shaft (220) so that the rotation shaft (220) is protected when the second casing (120) is pressed to stop the rotation member (200).

* * * * *